United States Patent [19]
Ansley et al.

[11] Patent Number: 5,726,671
[45] Date of Patent: Mar. 10, 1998

[54] HELMET/HEAD MOUNTED PROJECTOR SYSTEM

[75] Inventors: David A. Ansley, Sterling, Va.; Chungte Bill Chen, Irvine, Calif.

[73] Assignee: Hughes Electronics, Los Angeles, Calif.

[21] Appl. No.: 729,738

[22] Filed: Oct. 7, 1996

[51] Int. Cl.⁶ .................. G09G 5/00; G02B 6/06
[52] U.S. Cl. .................. 345/8; 345/7; 359/630; 385/116; 434/44
[58] Field of Search ............... 345/8, 7; 348/39, 348/115; 385/116, 115; 359/630, 631, 633; 434/44

[56] References Cited

U.S. PATENT DOCUMENTS

| | | | |
|---|---|---|---|
| 4,768,873 | 9/1988 | Webb | 351/205 |
| 5,136,675 | 8/1992 | Hodson | 385/116 |
| 5,166,778 | 11/1992 | Beamon, III | 345/8 X |
| 5,319,490 | 6/1994 | Ansley | 359/630 X |
| 5,326,266 | 7/1994 | Fisher et al. | 434/44 |
| 5,416,876 | 5/1995 | Ansley et al. | 385/116 |
| 5,487,665 | 1/1996 | Lechner et al. | 434/44 |
| 5,546,492 | 8/1996 | Ansley et al. | 345/8 X |
| 5,555,194 | 9/1996 | Cok | 364/526 |
| 5,572,229 | 11/1996 | Fisher | 345/8 |
| 5,589,956 | 12/1996 | Morishima et al. | 345/7 X |

*Primary Examiner*—Raymond J. Bayerl
*Assistant Examiner*—Seth D. Vail
*Attorney, Agent, or Firm*—Wanda K. Denson-Low; Michael W. Sales

[57] ABSTRACT

A head mounted projector system with extremely high resolution. The system includes a retro-reflecting gain screen. The on-helmet apparatus of the system includes a truncated spherical mirror, a redirecting multi-faceted mirror and a small rotating polygon scanner. The system includes off-helmet apparatus including a background image source and an area-of-interest (AOI) image source. The background and AOI images are scanned into a linear ribbon array of fibers. To provide 20/20 visual acuity, one fiber per each 0.7 arc-minute field-of-view is used.

45 Claims, 6 Drawing Sheets

A        B (BLANK)

HELMET/HEAD MOUNTED PROJECTOR SYSTEM

TECHNICAL FIELD OF THE INVENTION

This invention relates to the field of head mounted projectors, and more particularly to a head mounted projector with high resolution (visual acuity).

BACKGROUND OF THE INVENTION

Head mounted projectors are used in various applications, including training applications such as pilot training in simulators. In such applications, there is a need for head mounted projectors having extremely high resolution over a large field-of-view, so as to provide eye-limiting resolution. While various head mounted projectors have been employed in simulators, these known projectors have not provided the high resolution in both the horizontal and vertical directions demanded by many applications.

It would therefore be advantageous to provide a head mounted projector providing eye-limiting resolution over a large field-of-view.

SUMMARY OF THE INVENTION

A helmet/head mounted projector system is described, and includes a set of off-helmet mounted elements and a set of helmet-mounted elements. The set of off-helmet mounted elements includes a background image generator, an area-of-interest (AOI) image generator, apparatus for combining the background image and the AOI image to form a combined image, and apparatus for scanning the combined image into an input end of a fiber optic ribbon apparatus. The set of on-helmet/head mounted elements includes a rotating polygon scanner, optical apparatus for redirecting image light from an output end of the fiber optic ribbon apparatus onto the polygon scanner. The scanner redirects light onto a projection screen, preferably a retro-reflecting screen, for viewing by an observer.

BRIEF DESCRIPTION OF THE DRAWING

These and other features and advantages of the present invention will become more apparent from the following detailed description of an exemplary embodiment thereof, as illustrated in the accompanying drawings, in which:

FIG. 7 is a representation of an image showing representative background pixels.

FIG. 8 is a representation of the image of FIG. 6 after population with cloned background pixels.

DETAILED DESCRIPTION OF THE PREFERRED EMBODIMENT

Figure 1:
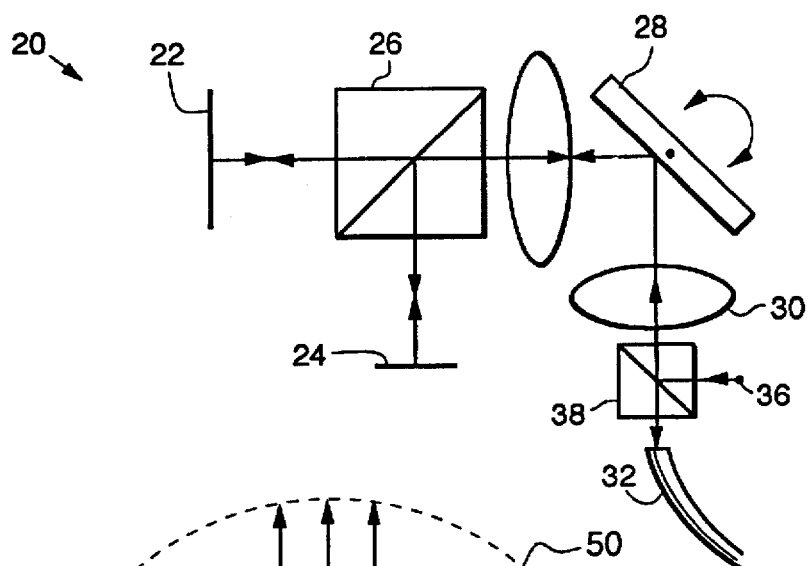
FIG. 1 is a schematic diagram of the off-head components of a head mounted projector embodying the invention.

In an exemplary embodiment illustrated in FIGS. 1-4, the elements of a projector system embodying the invention include a set of components which are not mounted on the helmet, a set of components which are mounted on the helmet, and the retro-reflecting screen. The set 20 of off-helmet/head components are illustrated in FIG. 1, and include off-helmet image sources 22 and 24, typically active matrix liquid crystal display (AMLCD) projectors. One image source 20 generates an image for the background. The second image source 22 generates an image for the area-of-interest (AOI). The AOI may be fixed (head tracked) or moving (eye-tracked). A head-tracked AOI is one in which the AOI tracks the direction of the head; e.g., when the head rotates to the left, the AOI tracks to the left. Similarly, an eye-tracked AOI is one in which the AOI tracks the direction of the gaze of the eyes.

Still referring to FIG. 1, a beam combiner 26 is situated to combine the background and AOI images into a combined image beam. The combined image beam is scanned by a galvo scanner 28 through a lens 30 into a linear array (ribbon) 32 of glass or plastic fibers. Because of the scanning method used, standard video bandwidth projectors are acceptable image sources. However, in order to achieve adequate brightness, the illumination (light source) should be line scanned from the top to the bottom of each projector. Line scanning from the AMLCD onto the ribbon is accomplished by the galvo scanner 28. Simultaneously, the illumination should be concentrated on the same AMLCD line that the galvo is scanning. This is because the scanner is imaging a specific line of the AMLCD onto the ribbon for approximately 1/N of the time, where N is the number of lines. Unless the illumination is concentrated on the same AMLCD line that the galvo is scanning, the amount of illumination focused into the ribbon will by 1/N of the total amount. There is no value in illuminating the remaining N-1 lines during the time the line scanner is "looking" at line n because the light from the N-1 lines will not be focused onto the ribbon. Only the light from line n will be focused onto the ribbon.

The illumination source 36 is a linear source such as a long incandescent wire. Light from the linear source 36 is directed by beam splitter/combiner 38 to both the background and AOI AMLCDs 22 and 24. In this exemplary implementation, both AMLCDs are of the reflective type. The image on the reflective AMLCD results from a pixel-by-pixel variation in the reflectivity produced by video signals to the active matrix, as is well known in the art. The reflected light travels back through the two beam combiners 26 and 38, the galvo scanner 28 and the lens 30 which focuses the light onto the end of the fiber optic ribbon 32. The combiner 38 can be a polarization sensitive combiner, with the light from the line source also polarized. Alternatively, a non-polarization sensitive beam combiner could also be used. Both types of optical beam combiners are well known in the art. Other implementations using transmittive AMLCDs are also suitable.

A goal is to achieve 20/20 visual acuity, which is the ability of the observer, e.g. the pilot using the projector, to see 2 arc-minutes per optical line pair (OLP). An OLP is one black line and one white line of equal width. Each line subtends an angle of 1 arc-minute as seen by the pilot. In order to minimize sampling artifacts such as flashing, the angular subtend of the fibers should be less than or equal to 0.7 arc-minutes. In a typical projected display of simulated out-the-cockpit-window imagery, the black and white lines may have any phasing with respect to the fibers. If the fibers were as large as the lines, then for one phasing (perfect alignment of the black and white lines with the fibers) all the light from the white lines would go into every other fiber. The pilot would clearly see the black and white lines. Conversely, for another phasing (alignment such that the black and white lines are displaced by ½ the spacing of the fibers), 50% of the light from the white line will go into each of the two adjacent fibers. Thus, the light coming out from the output end of the fiber ribbon will be the same intensity for each and every fiber. The pilot would see only a gray display of 50% brightness with no black and white lines. This appearance and disappearance of the black and white lines is called flashing. If the fiber spacing is 1 arc-minute, then the flashing is 100%. If the fiber spacing is 0.5 arc-minutes, then the flashing is 0%. However, the required number of fibers is doubled. Well known experiments have concluded that a fiber spacing of 0.7 arc-minute is a reasonable compromise between acceptable flashing and the number of fibers. Therefore, in the preferred embodiment, one glass fiber is used for each 0.7 arc-minute field of view (FOV). For example, 10.286 fibers are required for a 120 degree FOV. This can be achieved using 26 ribbons consisting of 400 fibers, arranged on 6 micron centers, in each ribbon. Each fiber is "perfect" in the sense of less than 10% variation in optical transmission from fiber to fiber. Gaps between ribbons are avoided by interleaving the ribbons into two rows of 13 ribbons each. Therefore, image streaking is minimized.

Figure 2:
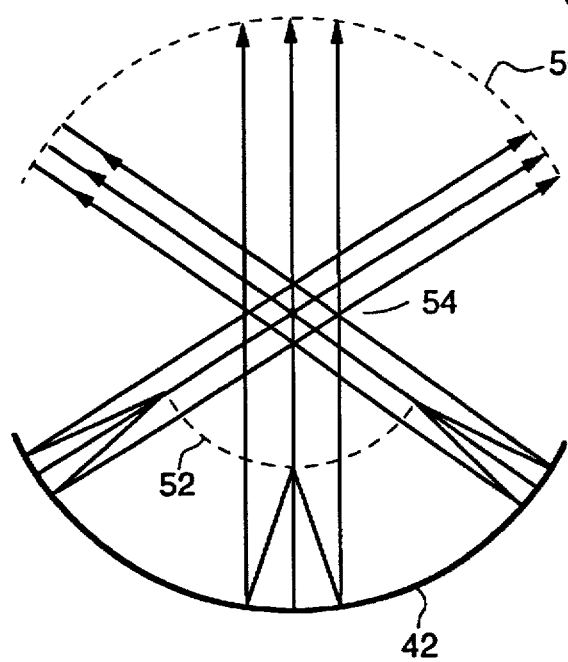
FIG. 2 illustrates a ray trace illustrating the optical design of the head mounted projector.
Figure 3:
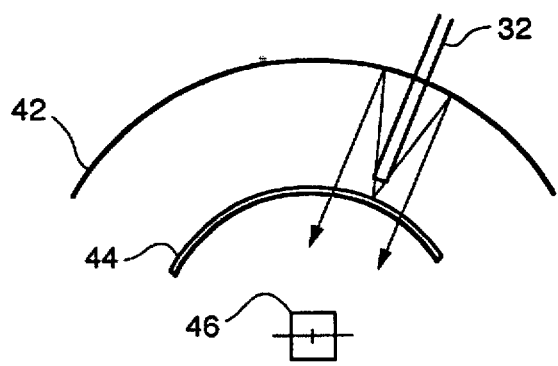
FIG. 3 is a front view of the head mounted projector of FIGS. 1 and 2.
Figure 3:
Figure 3:
Figure 4:
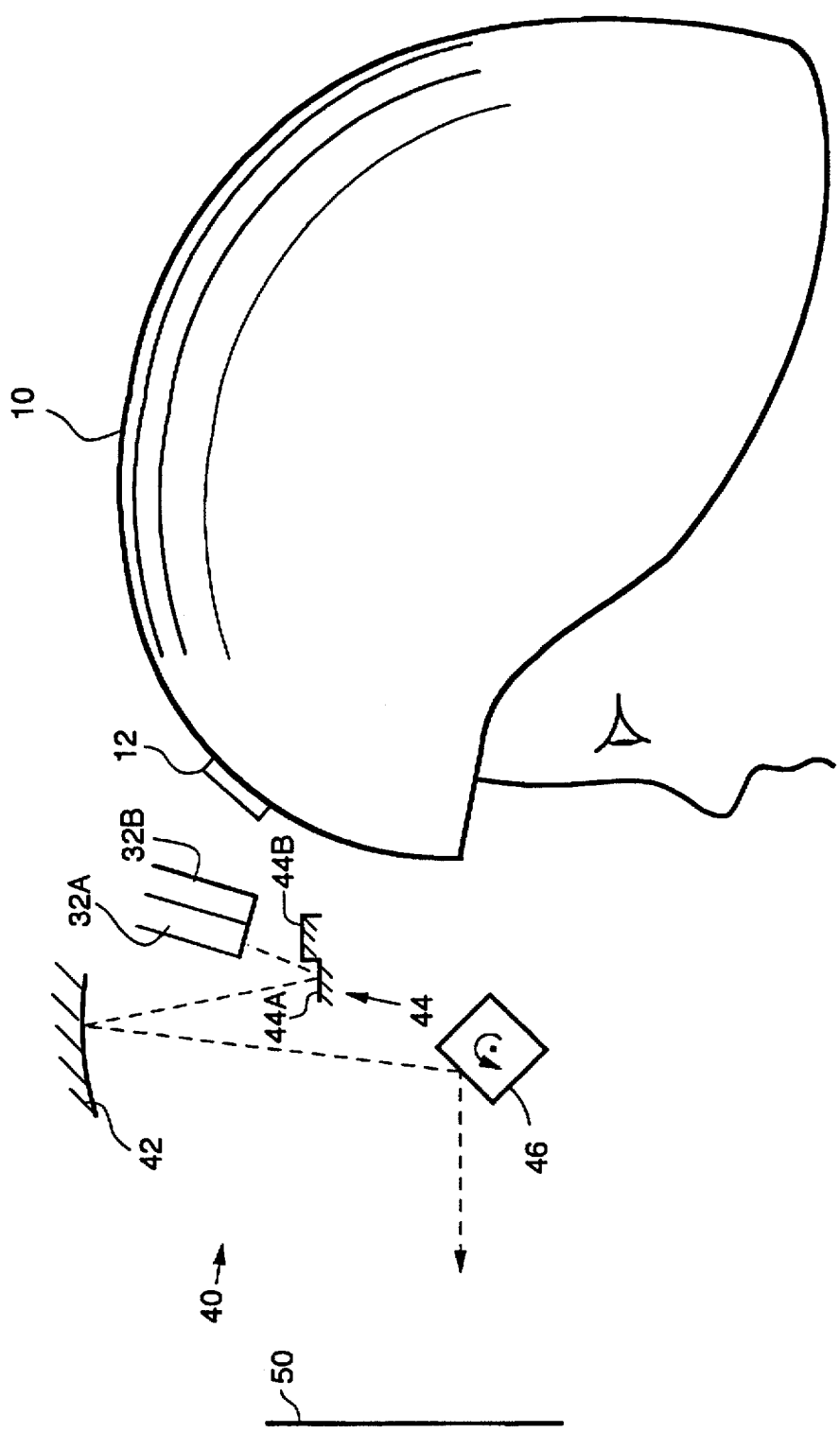
FIG. 4 is a side view of the head mounted projector of FIGS. 1-3.

The set 40 of on-helmet components comprising the exemplary embodiment of the projector system is illustrated in FIGS. 2–4, and includes a truncated (6 mm high in an exemplary embodiment) 30 mm focal length spherical mirror 42, a re-directing multi-faceted mirror 44 and a small (0.25 by 0.25 inch) four faceted polygon scanner 46 which rotates at only 15 revolutions per second. The mirror 44 is fabricated with flat segments equal in number to the number of fiber optic ribbons used in the optical path from the image generators; each segment is flat and oriented to direct light from a corresponding fiber optic ribbon to the spherical mirror 42. Of course, other implementations in accordance with this invention may use different element parameters. For example, the above described parameters are designed for operation at 60 television frames of video per second. The projector could of course be designed to operate at different frame rates, e.g. 50 or 70. The polygon scanner 46 can have 3, 4, 5 or more facets; the vertical scan angle is 720/(number of facets). For 4 facets, the vertical scan angle is 180 degrees. The video is active (turned on) for 120 degrees or 66.7% of the time. If a 3 facet mirror is used, the vertical scan angle would be 240 degrees, and the video would be active for 120 degrees or 50% of the time. If a 5 facet mirror is used, the vertical scan angle would be 144 degrees, and the video would be active for 120 degrees or 83.3% of the time.

FIG. 2 is a ray trace diagram showing rays emanating from the ends of the fiber optic ribbons at the image surface 52, re-directed onto the mirror 42, and directed by the polygon scanner (not shown in FIG. 2, but disposed in the center area 54 at the ray confluence) onto the projection screen 50. While the projection screen 50 is shown as a curved screen in FIG. 2, it can be flat or curved; FIG. 4 shows the screen as a flat surface.

The virtual image of the end of each ribbon should be at the image surface 52. For example, if the end of the ribbon is 1 mm from the multi-segmented mirror 44, then the multi-segmented mirror should be 31 mm from the center-of-curvature of the spherical mirror. Thus, the virtual image of the end of the ribbon will be 30 mm from the center-of-curvature. Note that the end of the ribbon should have a 30 mm radius of curvature. However, the depth-of-focus of the projector is greater than the difference between a straight-cut 2.4 mm wide ribbon and a curved-ribbon. Therefore, the simpler straight-cut ribbon may be used.

The image light from the image sources 22 and 24 is delivered from the image sources via the fiber optic ribbon 32, which in this exemplary embodiment is fabricated as two rows 32A and 32B fitted adjacent each other. Each row includes 13 fiber optic ribbons. The re-directing mirror 44 is in turn fabricated as two mirrors 44A and 44B, with mirror 44A positioned to re-direct image light from fiber 32A to the spherical mirror 42, and mirror 44B positioned to re-direct image light from fiber 32B to the spherical mirror 42. The foregoing dimensions and values are for an exemplary embodiment; other values will be found to be suitable for other applications in accordance with the invention.

The on-helmet components 40 can readily be mounted on a standard night vision goggle (NVG) bracket 12 extending from the pilot's helmet 10, as illustrated in FIG. 4. The projection point (optical system exit pupil) is located on the center of the helmet wearer's forehead and above his extreme upward FOV. This point is generally indicated by reference 54 in FIG. 2.

The projector in accordance with one aspect of the invention employs a retro-reflecting screen 50 to increase the brightness of the visual display. As is well known in the art, a retro-reflector is a device that reflects light such that the paths of the reflected rays are parallel to those of the incident rays. The screen is spaced from the helmet mounted projector elements, e.g. at least four feet away for an exemplary embodiment, and may be located on a simulator dome structure, or on the wall of an office, for example. In an exemplary embodiment, the screen has an optical gain of more than 1000. Consequently, the light (lumen) requirement is quite modest for a brightness goal of, say, 6 fl. Thus, the projected image light from the helmet mounted elements is reflected from the polygon scanner 46 to the retro-reflecting screen 50, which in turn reflects the light back to the eye of the person wearing the helmet 10. The screen 50 can be flat or curved.

Although the exemplary embodiment described above is for a 120 by 120 degree instantaneous FOV, it can be increased to approximately 160 by 160 degrees by increasing the number of ribbons from 26 to 34. Alternatively, two 120 by 120 degree displays can be mounted on the left and right side of the pilot's forehead in order to achieve a 220 (H) by 120 (V) instantaneous FOV, with a 40 degree overlap of the left and right displays in the central viewing region.

Figure 5:
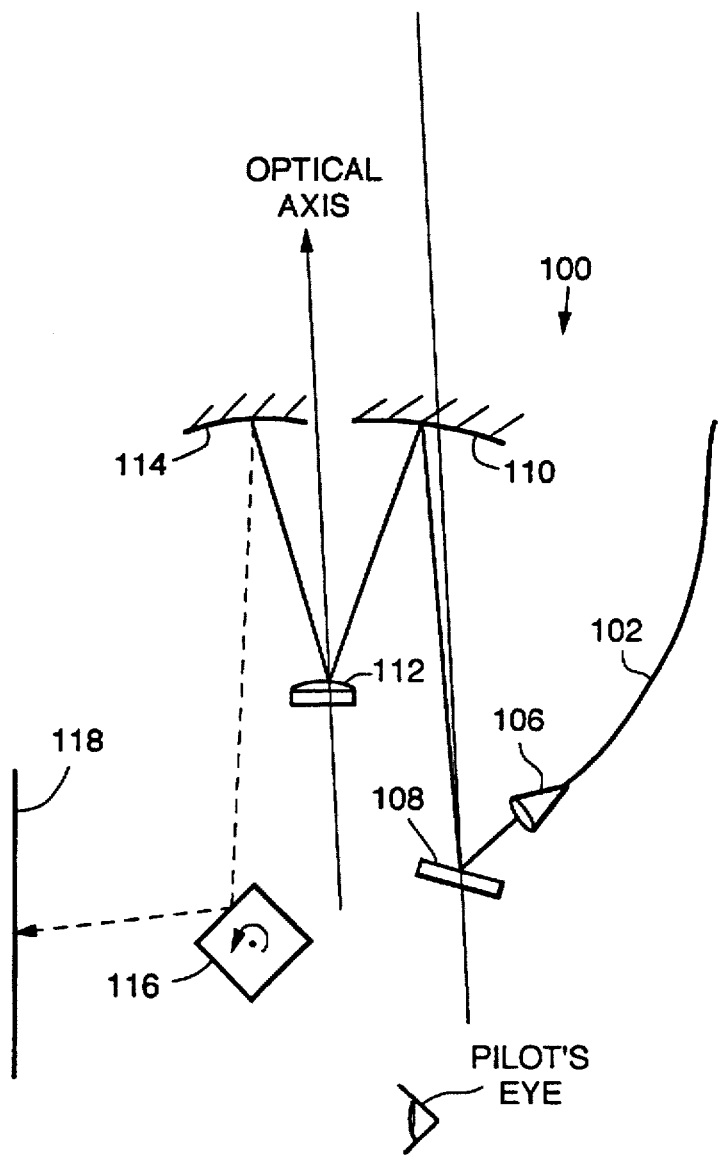
FIG. 5 is a schematic diagram of an alternate embodiment of a head/helmet mounted projector system in accordance with the invention.

An alternate embodiment of a helmet/head mounted projector system is illustrated in FIG. 5. This projector system has a 160 degree horizontal by 120 degree vertical FOV with a 20/20 visual acuity in the AOI and 20/200 visual acuity in the background. The AOI may be either head-tracked or eye-tracked.

The background resolution is 20 arc-minutes per optical line pair (OLP) for a 1040 by 1387 (1.44 Megapixel) image generator. An optical line pair is one black line and one white line of equal width. The AOI resolution is 2 arc-minutes per OLP (20/20 visual acuity). Using a 1200 by 1200 (1.44 megapixel) image generator, the FOV is 13.8 degrees. Use of a larger capacity image generator can increase the FOV.

Insetting of the AOI into the background is preferably done electronically, so that it is seamless and not noticeable to the observer. The background pixels can be electronically cloned or interpolated (or a blend of both) depending on their proximity to the AOI. The purpose of the cloned background pixels is to create sharp-edged pixels that improve peripheral motion cues. The purpose of interpolated pixels is to smoothly fill-in the gaps caused by the 10:1 disparity between image generator resolution and display resolution.

A single fiber-optic ribbon 102 comprising 300 fibers on 8 micron centers (300 times 8 microns=2.4 mm) connects the set 100 of helmet/head mounted projector elements with the set of off-helmet components which form a light modulation assembly. A single ribbon can be used in this embodiment, in contrast to the multiple ribbons for the embodiment of FIGS. 1–4, because a second polygon scanner is included in the embodiment of FIG. 5. The single ribbon is rotated at 90 degrees relative to the orientation of the ribbons in the embodiment of FIGS. 1–4. Thus, light from the output end of the ribbon 102 is directed to a fast polygon scanner 108 via a lens 106. The lens 106 collimates the light energy emerging from the 300 fibers at the end of the ribbon.

The scanner 108 sweeps the image of the ribbon in an arc that duplicates the image surface shown in FIG. 2 for the first embodiment. The scanner 108 sends the light from the scanner to a surface of spherical mirror 110, which redirects the light onto a field mirror 112 which is concentric with the spherical mirrors 110 and 114. The field mirror 112 redirects the light again onto a surface of the spherical mirror 114, which reflects the light onto the slow polygon scanner 116. The scanner 116 in turn redirects the light onto the retro-reflecting screen 118.

The screen 118 is preferably disposed at least 4 feet from the pilot's eyes. Retro-reflecting screens suitable for the purpose are commercially available, e.g. a screen marketed by the 3M Company as part 7610. This form of the screen 118 is preferably disposed at least 4 feet from the pilot's eyes. The screen can be located closer to the pilot's eyes, if a screen is used having lower index-of-refraction glass beads. For a given separation distance between the projector and eye, the angle defined by the lines from the eye to a point on the line from the point on the screen back to the projector increases with decreasing projector-to-screen distance. Lower index-of-refraction beads spread the retro-reflected light into a larger angle. Therefore, more light is returned to the eye.

Figure 6:
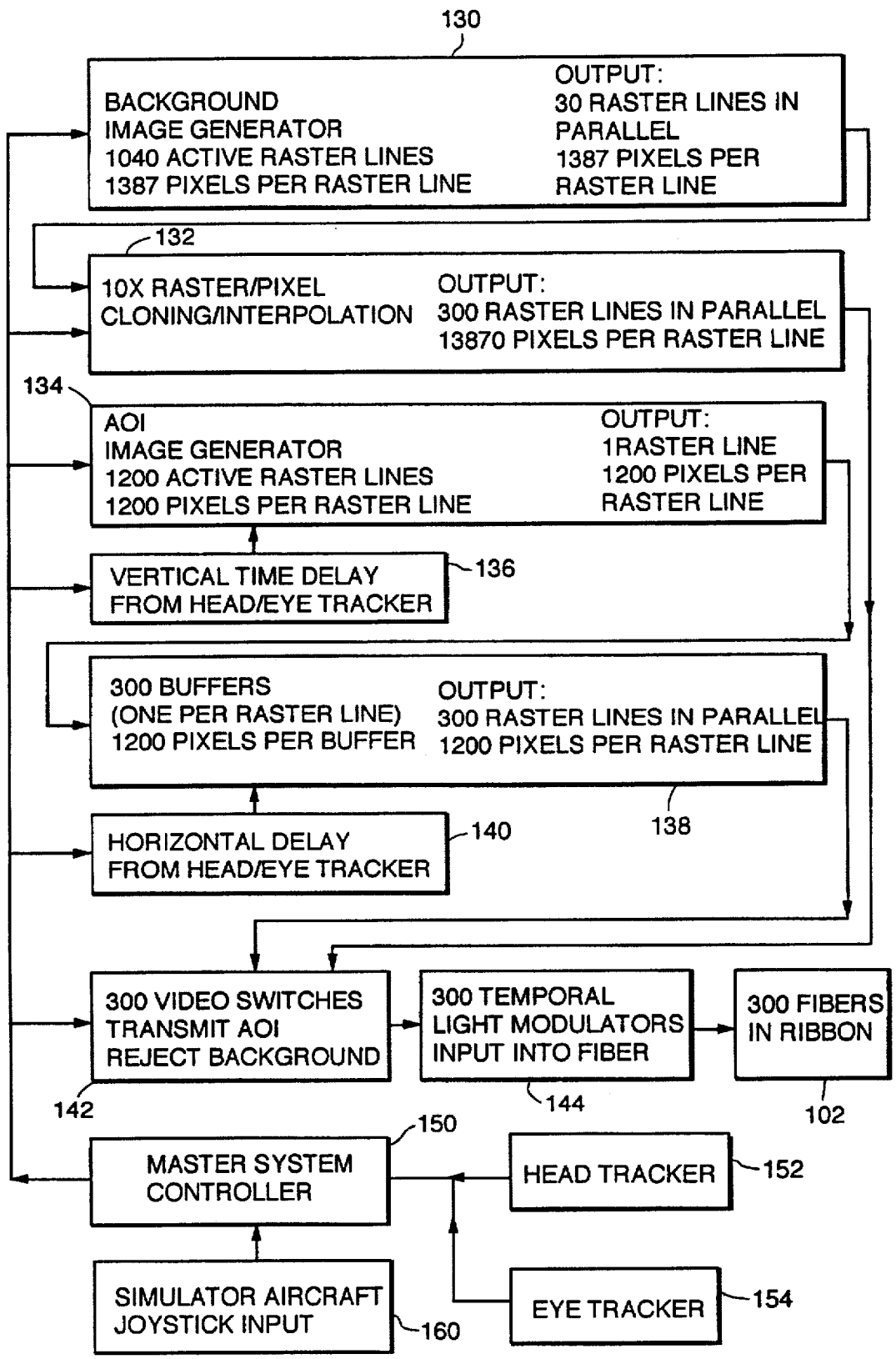
FIG. 6 is a block diagram of the system of FIG. 5.

FIG. 6 is a block diagram of off-helmet elements of the system 100. These elements include the background image generator 130, which in this exemplary embodiment generates 1040 active raster lines, with 1387 pixels per raster line, and outputs 30 lines in parallel. This background image generator output is provided to the cloning/interpolation circuit 132, which performs 10×raster pixel cloning/interpolation, outputing 300 raster lines in parallel with 13,870 pixels per raster line. The output of the circuit 132 is passed to the bank of 300 video switches 142, for selective combining with AOI imagery.

The background image generator 130, circuit 132 and video switch bank 142 receive commands from the master system controller 150.

The AOI image generator 134 generates 1200 active raster lines, with 1200 pixels per line, and outputs 1 raster line at a time, each line having 1200 pixels. The AOI generator 134 receives control signals from the master system controller 150 and the vertical time delay 136 command from the head/eye trackers 152, 154.

The AOI generator output is sent to buffer circuit 138, comprising 300 buffers, one per raster line. The controller 150 controls the operation of the circuit 138, with a horizontal delay 140 provided by the trackers 152, 154. The buffer circuit outputs 300 raster lines in parallel, with 1200 pixels per raster line, to a bank of 300 video switches 142 controlled by the controller 150, providing the capability of transmitting AOI pixels while rejecting the background pixels. The output from the video switch bank 142 is passed through a bank 144 of 300 temporal light source and modulators for input into the fiber ribbon 102.

As noted, for this exemplary embodiment, the total number of active raster lines over the 120 degree vertical FOV is 10,400. Three hundred raster lines are scanned at a time to form bands. The total number of bands is 10400/–300 times 180/120=52.

The eye is extremely sensitive to streaking. Therefore, it is desirable to individually gamma correct each of the 300 red/green/blue video signals over the full range from black to white. As is known in the art, gamma is the power of the relationship between the video voltage and display brightness. If gamma=1, then the relationship is linear. If gamma=2, then the relationship is quadratic, and so on. Due to manufacturing tolerances, display devices such as LED vary slightly in brightness for a given input video voltage. This slight variation should be corrected by boosting or suppressing the input video voltage for each LED. This boost or suppression is known as gamma correction.

The system 100 has 13,867 pixels displayed per raster line. The total number of display pixels is 10400 times 3867, or 144.2 Megapixels. The timing for the system is as follows:

Total vertical time is 1/60 seconds

Active vertical time=1/60×120/180=11.111 milliseconds

Total horizontal time=1/60×1/52=320.513 microseconds

Active horizontal time=1/60×1/52×160/180 =284.9 microseconds

Pixel rate=(13867 pixels)/(284.9 ms)=48.7 megapixels/second

The AOI pixels are stored in the buffer circuit 138, comprising 300 buffers containing 1200 pixels each. Readout time from the buffers is 320.513×(13.846/180)=15 24.654 microseconds. The time available for writing the next 300 raster lines of the 1200 raster line AOI into the buffers is 320.513–24.654=295.859 microseconds.

The AOI is electronically slewed within the background by delaying the start of buffer readout, using delay signals developed by the head/eye trackers 152, 154. Alternatively, the AOI pixels can be stored in the 300 background buffers each containing 13,867 pixels.

The fast polygon scanner 108 has 4 facets. Rotation velocity is 320.513 microseconds×4=1.28205 milliseconds per revolution. The number of revolutions per second is the inverse of 1.28205 milliseconds=780. The clear aperture of each facet is 5×5 mm.

The fast polygon scanner 108 can be eliminated if the number of ribbons which connect the helmet/head mounted projector elements with the off-helmet light modulation assembly is increased from 1 to 46.

The slow polygon 116 also has 4 facets. The rotation velocity is 1/60 second×4=0.06667 seconds per revolution. The number of revolutions per second is the inverse of 0.06667=15. The clear aperture of each facet is 5×5 mm.

The projector optics are very simple, as shown in FIG. 5. An all-mirror combination consisting of the three spherical mirrors 110, 112, 114 collimates the light from the ribbon 102, directs the light onto the fast polygon 108, relays it onto the slow polygon 116 and then focuses the light on the retro-reflecting screen 118. The radius of curvature of the primary mirror 114 in this exemplary embodiment is 79.45 mm. An exemplary beam width requirement for diffraction limited performance is 2.5 mm.

In alternate embodiments, the center-to-center spacing of the fibers in the fiber-optic ribbon is reduced to 6 or 4 microns, reducing the radius of curvature of the primary mirror to 60 mm or 40 mm. This will provide a more compact head/helmet mounted projector.

The principal of background pixel cloning and interpolation is the following. Assume that the display resolution is ten times finer than the background image generator resolution. Thus, the image generator outputs one pixel for every one hundred display pixels; i.e. most of the display pixels are black. The angular subtend of the fibers (as seen by the wearer of the helmet, i.e. the pilot, looking at the retro-reflecting screen) is 0.7 arc-minutes. The angular subtend of the background pixels is 7 arc-minutes. The angular subtend of the AOI pixels is the same as the fibers, i.e. 0.7 arc-minutes. Without pixel cloning or interpolation, along a raster line, the background would appear as just one pixel followed by a gap of 9 black spaces. Transverse to the raster lines, 9 out of 10 raster lines would have nothing, not even one pixel per 10 spaces along the raster line.

Figures 7, 8:
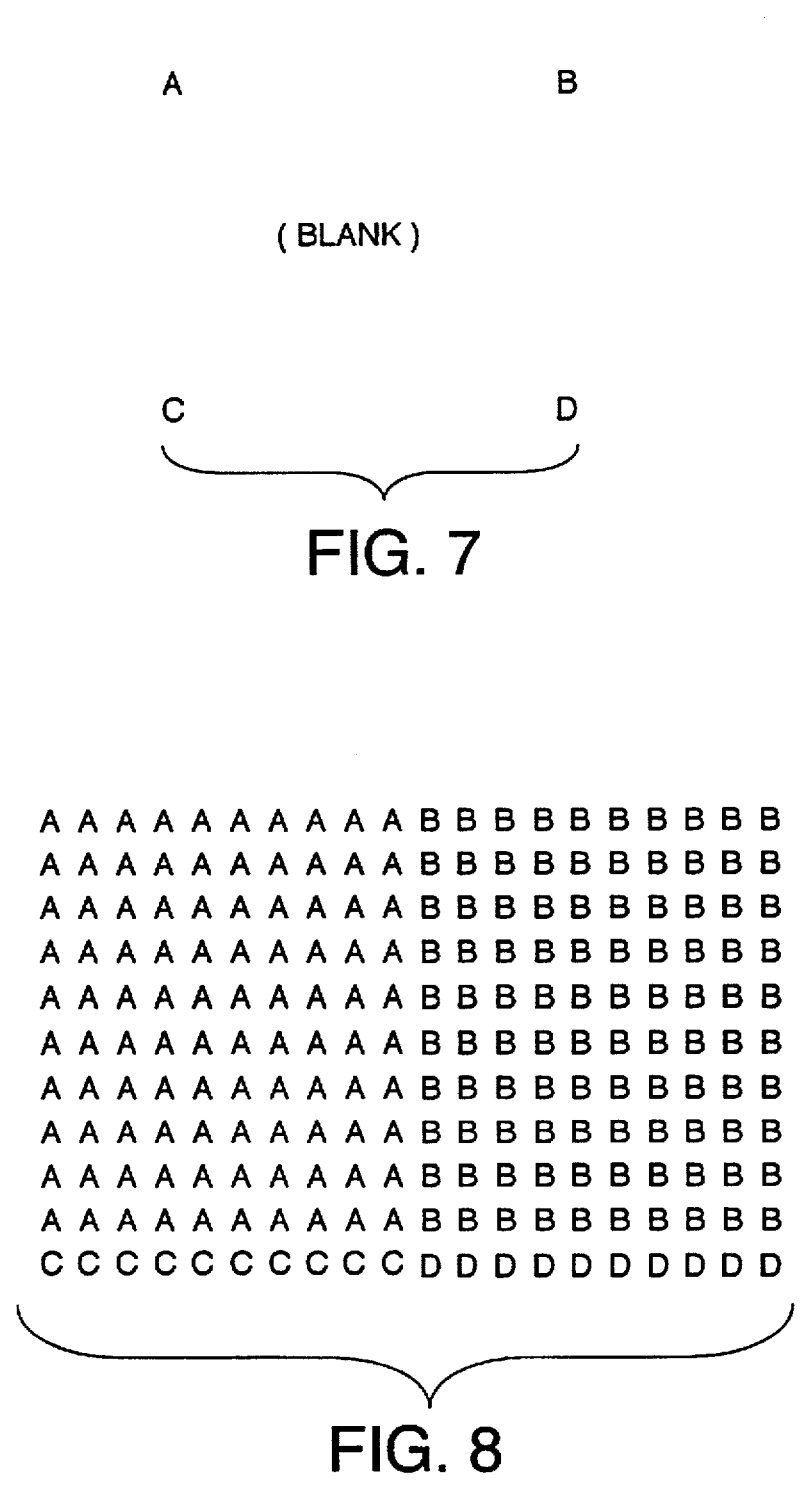

The image generator pixels are labeled as A, B, C and D in FIG. 7. Unless the brightness of the background pixels is increased, the background will be 1/100 as bright as the AOI. This is probably not possible, but would certainly produce maximum edge sharpness in the pilot's peripheral vision. For maximum edge sharpness and brightness, the background pixels are "cloned" as shown in FIG. 8; each pixel is cloned 99 times. FIG. 8 shows only a portion of the image, primarily the image region for the A and B pixels, and a small portion of the image region for the C and D pixels. A, B, C and D are just four background pixels out of the total (e.g., for this example, there are 1040 active raster lines, times 1,387 pixels per raster line, equals 1,442,480 pixels).

Figure 9:
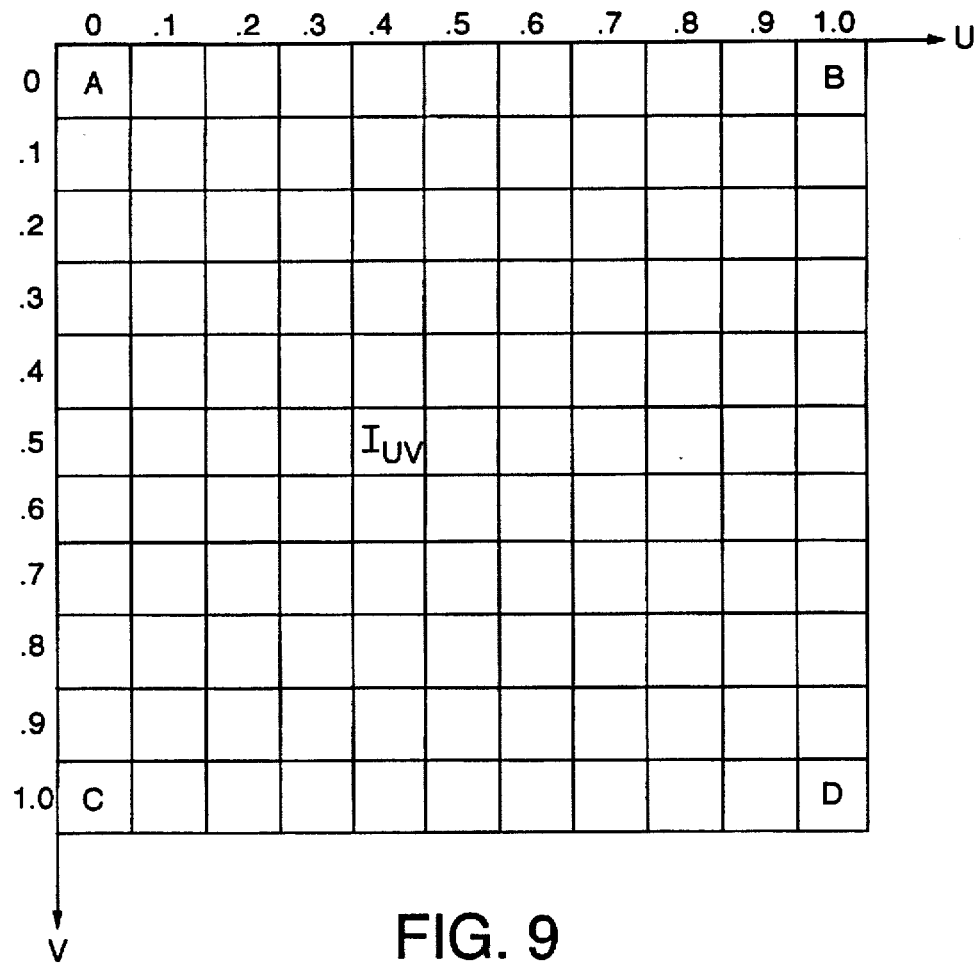
FIG. 9 illustrates the interpolation of the background pixels to provide a smooth image.

For maximum smoothness, the background image generator pixels should be interpolated with their neighbors. Preferably both intensity and chroma should be averaged. The interpolation can be implemented in accordance with the following bilateral interpolation equation, wherein the interpolation is performed in two directions, u and v (FIG. 9), between the pixels A, B, C and D, $$I_{u,v} = A(1-u)+Bu(1-v)+C(1-u)v+Duv$$

where A, B, C and D in this equation represent the corresponding intensity at background pixels A, B, C and D, and $I_{u,v}$ represents the intensity at pixel locations between the background pixels. The interpolation should be done for each of the primary colors.

Figure 10:
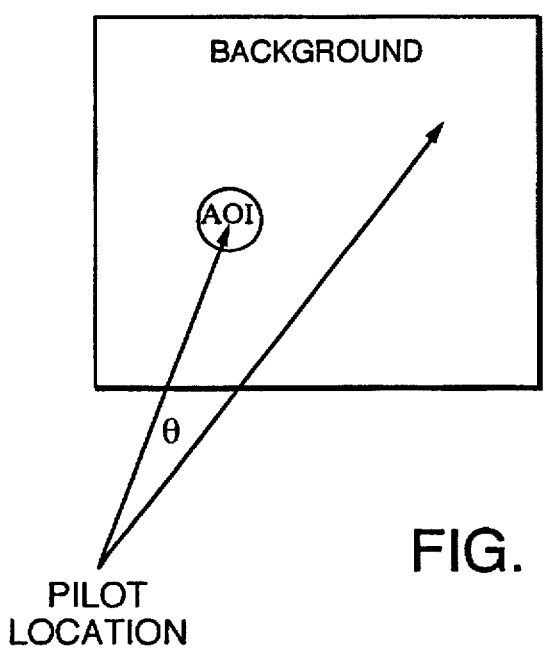
FIG. 10 illustrates the angular relationship between the background pixels projected onto the display screen as a function of angle from the pilot's eye and the area of interest.

Preferably, the background pixels are electronically cloned and/or interpolated in a ratio dependent on their proximity to the AOI. FIG. 10 illustrates the blending of the interpolated background image with the cloned background image as a function of the angle between the AOI and a particular pixel in the background, as viewed from the pilot's eye. When the angle θ is 0 degrees, i.e. adjacent to the AOI, the background image is 100% interpolated with no cloning. When the angle θ is 90 degrees or greater, the background image is 100% cloned with no interpolation. This can be generally expressed in the following manner. The background display as a function of θ equals the sum of F(θ) [interpolated image] plus (1−F(θ)) [cloned background], where "F" is a functional relationship. The value F(θ) can be a linear function of the angle, a quadratic function or a trigonometric function such as cosine(θ), or some other function.

Finally, 20/20 visual acuity using a helmet/head mounted projector requires a head and eye tracker with similar performance. Thus, for an exemplary embodiment, the tracker has a pointing stability of 0.25 arc-minutes or better. It is unacceptable to have the high resolution image jumping around as if the raster was unstable. The head tracker 152 calculates the x, y, z, roll, pitch, yaw of the head/helmet. The eye tracker 154 calculates the direction of gaze of the eye with respect to the head/helmet. Using the outputs from the trackers, the azimuth and elevation direction of gaze can be determined. It is well known that visual acuity is highest in the direction of gaze. Therefore, the center of the AOI should be positioned at the same azimuth and elevation as the direction of gaze.

The vertical location (elevation direction if the head is not tilted or rolled) of the AOI is changed by changing the vertical time delay (136) to the AOI image generator 134. If there is zero time delay, the AOI will be at the top of the display. If the time delay is 11.111 milliseconds, the AOI will be at the bottom of the display.

The horizontal location (azimuth direction if the head is not tilted or rolled) of the AOI is changed by adjusting the horizontal time delay (140) to the buffers. If there is zero time delay, the AOI will be at the left side of the display. If the time delay is 284.9 microseconds, the AOI will be at the right side of the display.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A helmet/head mounted projector system, comprising:
    a set of off-helmet mounted elements, including a background image generator, an area-of-interest (AOI) image generator, apparatus for combining the background image and the AOI image to form a combined image, said apparatus for combining said background image and said AOI image comprising a beam combiner, and apparatus for scanning the combined image into an input end of a fiber optic ribbon apparatus;
    a set of on-helmet/head mounted elements, said set including a rotating polygon scanner and an optical apparatus for redirecting image light from an output end of said fiber optic ribbon apparatus onto said polygon scanner; and
    a screen, said polygon scanner for redirecting said image light onto said screen for viewing by an observer.

2. The system of claim 1 wherein said screen comprises a retro-reflecting screen.

3. The system of claim 1 wherein said optical apparatus for redirecting image light from said output end includes a flat mirror and a spherical mirror for redirecting and collimating said image light.

4. The system of claim 1 wherein said fiber optic ribbon apparatus comprises a plurality of fiber optic ribbons, and said optical apparatus for redirecting light from said output end includes a flat mirror apparatus comprising a plurality of flat mirror segments, one each for said fiber optic ribbons, and a collimating mirror.

5. The system of claim 4 further characterized by a system field of view (FOV), and wherein said plurality of fibers comprises a number of fibers sufficient for one fiber for each 0.7 arc-minute of the system FOV.

6. The system of claim 1 wherein said apparatus for scanning said combined image into an input end of said fiber optic ribbon apparatus comprises a galvo scanner device for scanning said combined image.

7. The system of claim 6 wherein said AOI image generator comprises a first reflective liquid crystal display (LCD), said background image generator comprises a second LCD, and said apparatus for scanning further comprises a line illumination source for illuminating corresponding lines of said first and second LCDs being scanned by said galvo scanner.

8. The system of claim 7 wherein said apparatus for scanning further comprises a beam combiner for redirecting light from said line illumination source onto said first and second LCDs while passing said combined image.

9. The system of claim 1 wherein said polygon scanner rotates at a relatively slow rotation rate which does not exceed 20 revolutions per second.

10. The system of claim 9 wherein said polygon scanner has four facets.

11. The system of claim 1 wherein said AOI image generator has an AOI image resolution in AOI image pixels per line, said background image generator has a background image resolution in background image pixels per line, wherein said background image resolution is lower than said AOI resolution, and wherein said system further includes apparatus for cloning pixels defining said background image so as to produce fill-in pixels in said background image.

12. The system of claim 1 wherein said AOI image generator has an AOI image resolution in AOI image pixels per line, said background image generator has a background image resolution in background image pixels per line, wherein said background image resolution is lower than said AOI resolution, and wherein said system further includes apparatus for producing interpolated pixels defining said background image so as to produce fill-in pixels in said background image, wherein intensity values of said interpolated pixels are interpolated from intensity values of neighboring background pixels.

13. The system of claim 1 wherein said AOI image generator has an AOI image resolution in AOI image pixels per line, said background image generator has a background image resolution in background image pixels per line, wherein said background image resolution is lower than said AOI resolution, and wherein said system further includes:
cloning apparatus for cloning pixels defining said background image so as to produce a first set of fill-in pixels in said background image;
interpolating apparatus for producing interpolated pixels defining said background image so as to produce a second set of fill-in pixels in said background image, wherein intensity values of said interpolated pixels are interpolated from intensity values of neighboring background pixels; and
controller apparatus for controlling said cloning apparatus and said interpolating apparatus so as to produce cloned and/or interpolated pixels between neighboring background pixels in dependence on proximity of said neighboring background pixels to said AOI.

14. The system of claim 13 wherein said controller apparatus control said cloning apparatus and said interpolating apparatus so as to produce 100% interpolated pixels between neighboring background pixels located adjacent said AOI, and to produce 100% cloned pixels between neighboring background pixels located well away from said AOI.

15. A helmet/head mounted projector system, comprising:
a set of off-helmet mounted elements, including a background image generator, an area-of-interest (AOI) image generator, apparatus for combining the background image and the AOI image to form a combined image, and apparatus for scanning the combined image into an input end of a fiber optic ribbon apparatus;
a set of on-helmet/head mounted elements, said set including a first optical scanner and a second optical scanner, a first optical apparatus for redirecting image light from an output end of said fiber optic ribbon apparatus onto said first scanner, a second optical apparatus for redirecting light reflected from said first scanner onto said second scanner; and
a screen, said second scanner for redirecting said image light onto said screen for viewing by an observer.

16. The system of claim 15, wherein said first scanner is a first rotating polygon scanner, said second scanner is a second rotating polygon scanner, and wherein said first scanner rotates at a first rotation rate, said second scanner rotates at a second rotation rate, and said first rate is faster than said second rate.

17. The system of claim 16 wherein said second polygon scanner rotates at a relatively slow rotation rate which does not exceed 70 revolutions per second.

18. The system of claim 16 wherein said screen comprises a retro-reflecting screen.

19. The system of claim 16 wherein said second optical apparatus includes a spherical mirror having a center of curvature and a field mirror located at said center of curvature.

20. The system of claim 16 further characterized by a system field of view (FOV), and wherein said fiber optic ribbon apparatus is a single fiber optic ribbon comprising a plurality of optical fibers sufficient in number and of appropriate size such that said ribbon has one fiber for each 0.7 arc-minute of the system FOV.

21. The system of claim 16 wherein said apparatus for scanning said combined image into an input end of said fiber optic ribbon apparatus comprises a galvo scanner device for scanning said combined image.

22. The system of claim 21 wherein said AOI image generator comprises a first reflective liquid crystal display (LCD), said background image generator comprises a second LCD, and said apparatus for scanning further comprises a line illumination source for illuminating corresponding lines of said first and second LCDs being scanned by said galvo scanner.

23. The system of claim 22 wherein said apparatus for scanning further comprises a beam combiner for redirecting light from said line illumination source onto said first and second LCDs while passing said combined image.

24. The system of claim 16 wherein said AOI image generator has an AOI image resolution in AOI image pixels per line, said background image generator has a background image resolution in background image pixels per line, wherein said background image resolution is lower than said AOI resolution, and wherein said system further includes apparatus for cloning pixels defining said background image so as to produce fill-in pixels in said background image.

25. The system of claim 16 wherein said AOI image generator has an AOI image resolution in AOI image pixels per line, said background image generator has a background image resolution in background image pixels per line, wherein said background image resolution is lower than said AOI resolution, and wherein said system further includes apparatus for producing interpolated pixels defining said background image so as to produce fill-in pixels in said background image, wherein intensity values of said interpolated pixels are interpolated from intensity values of neighboring background pixels.

26. The system of claim 16 wherein said AOI image generator has an AOI image resolution in AOI image pixels per line, said background image generator has a background image resolution in background image pixels per line, wherein said background image resolution is lower than said AOI resolution, and wherein said system further includes:
    cloning apparatus for cloning pixels defining said background image so as to produce a first set of fill-in pixels in said background image;
    interpolating apparatus for producing interpolated pixels defining said background image so as to produce a second set of fill-in pixels in said background image, wherein intensity values of said interpolated pixels are interpolated from intensity values of neighboring background pixels; and
    controller apparatus for controlling said cloning apparatus and said interpolating apparatus so as to produce cloned and/or interpolated pixels between neighboring background pixels in dependence on proximity of said neighboring background pixels to said AOI.

27. The system of claim 26 wherein said controller apparatus control said cloning apparatus and said interpolating apparatus so as to produce 100% interpolated pixels between neighboring background pixels located adjacent said AOI, and to produce 100% cloned pixels between neighboring background pixels located well away from said AOI.

28. The system of claim 16 wherein said apparatus for combining said background image and said AOI image is an electronic image combining means.

29. A helmet/head mounted projector system, comprising:
    a set of off-helmet mounted elements, including a background image generator, an area-of-interest (AOI) image generator, apparatus for combining the background image and the AOI image to form a combined image, and apparatus for scanning the combined image into an input end of a fiber optic ribbon apparatus, said apparatus for scanning said combined beam into an input end of said fiber optic ribbon apparatus comprising a galvo scanner device for scanning said combined image;
    a set of on-helmet/head mounted elements, said set including a rotating polygon scanner and an optical apparatus for redirecting image light from an output end of said fiber optic ribbon apparatus onto said polygon scanner; and
    a screen, said polygon scanner for redirecting said image light onto said screen for viewing by an observer.

30. The system of claim 29 wherein said AOI image generator comprises a first reflective liquid crystal display (LCD), said background image generator comprises a second LCD, and said apparatus for scanning further comprises a line illumination source for illuminating corresponding lines of said first and second LCDs being scanned by said galvo scanner.

31. The system of claim 30 wherein said apparatus for scanning further comprises a beam combiner for redirecting light from said line illumination source onto said first and second LCDs while passing said combined image.

32. A helmet/head mounted projector system, comprising:
    a set of off-helmet mounted elements, including a background image generator, an area-of-interest (AOI) image generator, apparatus for combining the background image and the AOI image to form a combined image, said apparatus for combining including an electronic image combining circuit, and apparatus for scanning the combined image into an input end of a fiber optic ribbon apparatus;
    a set of on-helmet/head mounted elements, said set including a rotating polygon scanner and an optical apparatus for redirecting image light from an output end of said fiber optic ribbon apparatus onto said polygon scanner; and
    a screen, said polygon scanner for redirecting said image light onto said screen for viewing by an observer.

33. The system of claim 32 wherein said screen comprises a retro-reflecting screen.

34. The system of claim 33 wherein said optical apparatus for redirecting image light from said output end includes a flat mirror and a spherical mirror for redirecting and collimating said image light.

35. The system of claim 33 wherein said fiber optic ribbon apparatus comprises a plurality of fiber optic ribbons, and said optical apparatus for redirecting light from said output end includes a flat mirror apparatus comprising a plurality of flat mirror segments, one each for said fiber optic ribbons, and a collimating mirror.

36. The system of claim 35 further characterized by a system field of view (FOV), and wherein said plurality of fibers comprises a number of fibers sufficient for one fiber for each 0.7 arc-minute of the system FOV.

37. The system of claim 33 wherein said apparatus for scanning said combined image into an input end of said fiber optic ribbon apparatus comprising a galvo scanner device for scanning said combined image.

38. The system of claim 37 wherein said AOI image generator comprises a first reflective liquid crystal display (LCD), said background image generator comprises a second LCD, and said apparatus for scanning further comprises a line illumination source for illuminating corresponding lines of said first and second LCDs being scanned by said galvo scanner.

39. The system of claim 38 wherein said apparatus for scanning further comprises a beam combiner for redirecting light from said line illumination source onto said first and second LCDs while passing said combined image.

40. The system of claim 33 wherein said polygon scanner rotates at a relatively slow rotation rate which does not exceed 20 revolutions per second.

41. The system of claim 40 wherein said polygon scanner has four facets.

42. The system of claim 33 wherein said AOI image generator has an AOI image resolution in AOI image pixels per line, said background image generator has a background image resolution in background image pixels per line, wherein said background image resolution is lower than said AOI resolution, and wherein said system further includes apparatus for cloning pixels defining said background image so as to produce fill-in pixels in said background image.

43. The system of claim 33 wherein said AOI image generator has an AOI image resolution in AOI image pixels per line, said background image generator has a background image resolution in background image pixels per fine, wherein said background image resolution is lower than said AOI resolution, and wherein said system further includes apparatus for producing interpolated pixels defining said background image so as to produce fill-in pixels in said background image, wherein intensity values of said interpolated pixels are interpolated from intensity values of neighboring background pixels.

44. The system of claim 33 wherein said AOI image generator has an AOI image resolution in AOI image pixels per line, said background image generator has a background image resolution in background image pixels per line, wherein said background image resolution is lower than said AOI resolution, and wherein said system further includes:

cloning apparatus for cloning pixels defining said background image so as to produce a first set of fill-in pixels in said background image;

interpolating apparatus for producing interpolated pixels defining said background image so as to produce a second set of fill-in pixels in said background image, wherein intensity values of said interpolated pixels are interpolated from intensity values of neighboring background pixels; and controller apparatus for controlling said cloning apparatus and said interpolating apparatus so as to produce cloned and/or interpolated pixels between neighboring background pixels in dependence on proximity of said neighboring background pixels to said AOI.

45. The system of claim 44 wherein said controller apparatus control said cloning apparatus and said interpolating apparatus so as to produce 100% interpolated pixels between neighboring background pixels located adjacent said AOI, and to produce 100% cloned pixels between neighboring background pixels located well away from said AOI.

* * * * *